(12) United States Patent
Li et al.

(10) Patent No.: US 12,393,478 B2
(45) Date of Patent: Aug. 19, 2025

(54) PROPAGATION-BASED FAULT DETECTION AND DISCRIMINATION METHOD AND THE OPTIMIZATION OF SENSOR DEPLOYMENT

(71) Applicant: OHIO STATE INNOVATION FOUNDATION, Columbus, OH (US)

(72) Inventors: Boyuan Li, Columbus, OH (US); Carol Smidts, Columbus, OH (US); Xiaoxu Diao, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/285,705

(22) PCT Filed: Feb. 7, 2022

(86) PCT No.: PCT/US2022/015464
§ 371 (c)(1),
(2) Date: Oct. 5, 2023

(87) PCT Pub. No.: WO2022/216356
PCT Pub. Date: Oct. 13, 2022

(65) Prior Publication Data
US 2025/0077326 A1 Mar. 6, 2025

Related U.S. Application Data

(60) Provisional application No. 63/171,699, filed on Apr. 7, 2021.

(51) Int. Cl.
*G06F 11/07* (2006.01)
*G06F 17/13* (2006.01)

(52) U.S. Cl.
CPC ...... *G06F 11/0751* (2013.01); *G06F 11/0721* (2013.01); *G06F 17/13* (2013.01)

(58) Field of Classification Search
CPC ... G06F 11/0751; G06F 11/0721; G06F 17/13
See application file for complete search history.

(56) References Cited

U.S. PATENT DOCUMENTS 6,223,143 B1 4/2001 Weinstock et al.
2017/0286204 A1* 10/2017 Dibowski ........... G06F 11/0751
(Continued)

OTHER PUBLICATIONS

International Search Report and Written Opinion, dated May 12, 2022, received in connection with corresponding International Patent Application No. PCT/US2022/015464.
(Continued)

*Primary Examiner* — Yair Leibovich
(74) *Attorney, Agent, or Firm* — Meunier Carlin & Curfman LLC

(57) ABSTRACT

A model (137) is created of a system (110) to be monitored (805). Operating states of the monitored system, including steady and transient states, are identified. Faults are injected into the model and the model is used to simulate each of the identified operating states (810). Results of each simulation are analyzed and used to develop one or more propagation-based fault detection and discrimination strategies (147) that can be used to identify faults in each of the identified operating states (815). The strategies may further be used to select an optimal set of sensors (155) to assist with fault detection.

20 Claims, 10 Drawing Sheets

(56) References Cited

U.S. PATENT DOCUMENTS

2017/0329289 A1  11/2017  Kohn et al.
2021/0033360 A1* 2/2021  Bollas ............... G06N 3/126

OTHER PUBLICATIONS

Barricelli et al., "A survey on digital twin: Definitions, characteristics, applications, and design implications." IEEE access 7 (2019): 167653-167671.
Beard, R., "Failure accommodation in linear system through self reorganization." Doctoral Thesis, Massachusetts Institute of Technology (1971): 71-77.
Berkan et al., "Low-order dynamic modeling of the Experimental Breeder Reactor II." No. ORNL/TM--11161. Oak Ridge National Lab (1990): 1-129.
Bhushan et al., "Design of sensor network based on the signed directed graph of the process for efficient fault diagnosis." Industrial & engineering chemistry research 39.4 (2000): 999-1019.
Briggs, C., "Quality counts: new parameters in blood cell counting." International journal of laboratory hematology 31.3 (2009): 277-297.
Brugnara et al., "Red cell indices in classification and treatment of anemias: from MM Wintrobes's original 1934 classification to the third millennium." Current opinion in hematology 20.3 (2013): 222-230.
Caccavale et al., "Discrete-time framework for fault diagnosis in robotic manipulators." IEEE Transactions on Control Systems Technology 21.5 (2012): 1858-1873.
Cadwallader, L., "Preliminary failure modes and effects analysis of the US DCLLtest blanket module." No. INL/EXT-07-13115. Idaho National Lab.(INL), Idaho Falls, ID (United States) (2010): 181 pages.
Camaschella, C., "New insights into iron deficiency and iron deficiency anemia." Blood reviews 31.4 (2017): 225-233.
Cardozo et al., "A distributed expert system for fault diagnosis." IEEE Transactions on power systems 3.2 (1988): 641-646.
Chalmers et al., "Femtogram resolution of iron content on a per cell basis: ex vivo storage of human red blood cells leads to loss of hemoglobin." Analytical chemistry 89.6 (2017): 3702-3709.
Chaudhary et al., "Techniques used for the screening of hemoglobin levels in blood donors: current insights and future directions." Journal of blood medicine (2017): 75-88.
Commault et al., "Sensor location for diagnosis in linear systems: A structural analysis." IEEE Transactions on Automatic Control 52.2 (2007): 155-169.
D'Onofrio et al. "Erythropoietic Function Assessment: Development of Methodology-the Sysmex XE-2100TM." Infusion Therapy and Transfusion Medicine/Infusionstherapie und Transfusionsmedizin 28.5 (2001): 285-291.
De Moura et al., "Z3: An efficient SMT solver." International conference on Tools and Algorithms for the Construction and Analysis of Systems. Berlin, Heidelberg: Springer Berlin Heidelberg (2008): 337-340.
Diao et al., "Fault propagation and effects analysis for designing an online monitoring system for the secondary loop of the nuclear power plant portion of a hybrid energy system." Nuclear Technology 202.2-3 (2018): 106-123.
Djeziri et al., "Optimal sensor placement for fault diagnosis." 2009 IEEE International Conference on Mechatronics. IEEE, (2009), pp. 1-6.
Frank, P., "Analytical and qualitative model-based fault diagnosis-a survey and some new results." European Journal of control 2.1 (1996): 6-28.
Gao et al., "Optimal sensor placement for momentum wheel fault diagnosis using Bayesian network." 2017 36th Chinese Control Conference (CCC). IEEE, 2017, pp. 7099-7103.
Gómez-Pastora et al., "Intrinsically magnetic susceptibility in human blood and its potential impact on cell separation: Non-classical and intermediate monocytes have the strongest magnetic behavior in fresh human blood." Experimental hematology 99 (2021): 21-31.
Harms et al., "Beyond soluble transferrin receptor: old challenges and new horizons." Best practice & research Clinical endocrinology & metabolism 29.5 (2015): 799-810.
Harris et al., "Performance evaluation of the ADVIA 2120 hematology analyzer: an international multicenter clinical trial." Laboratory Hematology 11.1 (2005): 62-70.
Harris et al., "The ADVIA 2120 hematology system: flow cytometry-based analysis of blood and body fluids in the routine hematology laboratory." Laboratory Hematology 11.1 (2005): 47-61.
Heikali et al., "A niche for microfluidics in portable hematology analyzers." JALA: Journal of the Association for Laboratory Automation 15.4 (2010): 319-328.
Jansen, V., "Diagnosis of anemia—A synoptic overview and practical approach." Transfusion and Apheresis Science 58.4 (2019): 375-385.
Jiang et al., "Multi-objective optimal placement of sensors based on quantitative evaluation of fault diagnosability." IEEE Access 7 (2019): 117850-117860.
Jin et al., "Quantification of changes in oxygen release from red blood cells as a function of age based on magnetic susceptibility measurements." Analyst 136.14 (2011): 2996-3003.
Kim et al., "A subpopulation of monocytes in normal human blood has significant magnetic susceptibility: Quantification and potential implications." Cytometry Part A 95.5 (2019): 478-487.
Kim et al., "Quantification of the Mean and Distribution of Hemoglobin Content in Normal Human Blood Using Cell Tracking Velocimetry." Analytical Chemistry 92.2 (2020): 1956-1962.
Kiss et al., "Laboratory variables for assessing iron deficiency in REDS-II I ron S tatus E valuation (RISE) blood donors." Transfusion 53.11 (2013): 2766-2775.
Kiss, J., "Laboratory and genetic assessment of iron deficiency in blood donors." Clinics in laboratory medicine 35.1 (2015): 73-91.
Krysander et al., "Sensor placement for fault diagnosis." IEEE Transactions on Systems, Man, and Cybernetics—Part A: Systems and Humans 38.6 (2008): 1398-1410.
Lane et al., "Benchmark of gothic to ebr-ii shrt-17 and shrt-45r tests." Nuclear Technology 206.7 (2020): 1019-1035.
Lei et al., "Fault diagnosis of wind turbine based on Long Short-term memory networks." Renewable energy 133 (2019): 422-432.
Lew et al., "Ion transport pathology in the mechanism of sickle cell dehydration." Physiological reviews 85.1 (2005): 179-200.
Li et al., "A Quantification Framework for Software Safety in the Requirements Phase: Application to Nuclear Power Plants." 2018 Annual Reliability and Maintainability Symposium (RAMS) IEEE, 2018, pp. 1-7.
Li et al., "Effects Assessment for Requirements Faults of Safety Critical Software in Nuclear Industry." 2020 Annual Reliability and Maintainability Symposium (RAMS). IEEE, 2020, pp. 1-6.
Lin et al., "Development and assessment of a nearly autonomous management and control system for advanced reactors." Annals of Nuclear Energy 150 (2021): 1-45.
Long et al., "Emergency Medicine Evaluation and Management of Anemia." Emergency Medicine Clinics of North America 36.3 (2018): 609-630.
Mutha et al., "An early design stage UML-based safety analysis approach for high assurance software systems." 2011 IEEE 13th International Symposium on High-Assurance Systems Engineering. IEEE, (2011), pp. 202-211.
Mutha et al., "An integrated multidomain functional failure and propagation analysis approach for safe system design." AI EDAM 27.4 (2013): 317-347.
Mutha, C., "Software Fault Propagation and Failure Analysis for UML Based Software Design." Doctoral Dissertation, The Ohio State University, (2014). 203 pages.
Neufeld et al., "Hemoglobin concentration and anemia diagnosis in venous and capillary blood: biological basis and policy implications." Annals of the new York Academy of Sciences 1450.1 (2019): 172-189.
Nguyen et al., "A probabilistic model-based diagnostic framework for nuclear engineering systems." Annals of Nuclear Energy 149 (2020): 1-37.

(56) References Cited

OTHER PUBLICATIONS

Pasricha, S., "Should we screen for iron deficiency anaemia? A review of the evidence and recent recommendations." Pathology 44.2 (2012): 139-147.
Paterakis et al., "The effect of red cell shape on the measurement of red cell volume. A proposed method for the comparative assessment of this effect among various haematology analysers." Clinical & Laboratory Haematology 16.3 (1994): 235-245.
Pauling et al., "The magnetic properties and structure of hemoglobin, oxyhemoglobin and carbonmonoxyhemoglobin." Proceedings of the National Academy of Sciences 22.4 (1936): 210-216.
Pauling et al., "The magnetic properties and structure of the hemochromogens and related substances." Proceedings of the National Academy of Sciences 22.3 (1936): 159-163.
Peyrin-Biroulet et al., "Guidelines on the diagnosis and treatment of iron deficiency across indications: a systematic review." The American journal of clinical nutrition 102.6 (2015): 1585-1594.
Pivina et al., "Iron deficiency, cognitive functions, and neurobehavioral disorders in children." Journal of Molecular Neuroscience 68 (2019): 1-10.
Reiter, R., "A theory of diagnosis from first principles." Artificial intelligence 32.1 (1987): 57-95.
Sahri et al., "Support vector machine-based fault diagnosis of power transformer using k nearest-neighbor imputed DGA dataset." Journal of Computer and Communications 2.09 (2014): 22-31.
Savage, R., "The red cell indices: Yesterday, today, and tomorrow." Clinics in laboratory medicine 13.4 (1993): 773-785.
Schaefer et al., "Hypochromic red blood cells and reticulocytes." Kidney international 55 (1999): S44-S48.
Shander et al., "What is really dangerous: anaemia or transfusion?. " British journal of anaesthesia 107.suppl_1 (2011): i41-i59.
Shatnawi et al., "Fault diagnosis in internal combustion engines using extension neural network." IEEE Transactions on Industrial Electronics 61.3 (2013): 1434-1443.
Spanache et al., "Sensor placement optimisation using genetic algorithms." 15th international Workshop on Principles of Diagnosis (DX'04). (2004): 179-184.
Speeckaert et al. "Biological and clinical aspects of soluble transferrin receptor." Critical reviews in clinical laboratory sciences 47.5-6 (2010): 213-228.
Stuart et al., "Sickle-cell disease." The Lancet 364.9442 (2004): 1343-1360.
Sullivan, E., "Hematology analyzer: From workhorse to thoroughbred." Laboratory Medicine 37.5 (2006): 273-278.
Sumner et al., "Benchmark specifications and data requirements for EBR-II shutdown heat removal tests SHRT-17 and SHRT-45R." No. ANL-ARC-226 Rev. 1. Argonne National Lab.(ANL), Argonne, IL (United States), (2012) 150 pages.
Sztyber, A., "Sensor placement for fault diagnosis using graph of a process." Journal of Physics: Conference Series. 783. No. 1. IOP Publishing (2017): 1-12.
Travé-Massuyès et al., "Diagnosability analysis based on component supported analytical redundancy relations." IFAC Proceedings vols. 36.5 (2003): 819-824.
Trothe et al., "Fault isolability analysis and optimal sensor placement for fault diagnosis in smart buildings." Energies 12.9 (2019): 1-12.
Urrechaga et al., "Biomarkers of hypochromia: the contemporary assessment of iron status and erythropoiesis." BioMed research international 2013 (2013) 1-9.
Venkatasubramanian et al., "A review of process fault detection and diagnosis: Part III: Process history based methods." Computers & chemical engineering 27.3 (2003): 327-346.
Verbrugge et al., "Verification and standardization of blood cell counters for routine clinical laboratory tests." Clinics in laboratory medicine 35.1 (2015): 183-196.
Wang, Xun, et al. "Nonlinear PCA with the local approach for diesel engine fault detection and diagnosis." IEEE Transactions on Control Systems Technology 16.1 (2007): 122-129.
Weigand et al., "Magnetophoretic and spectral characterization of oxyhemoglobin and deoxyhemoglobin: Chemical versus enzymatic processes." PLoS One 16.9 (2021): 1-14.
Whitehead Jr. et al., "Methods and analyzers for hemoglobin measurement in clinical laboratories and field settings." Annals of the New York Academy of Sciences 1450.1 (2019): 147-171.
Whitley, D., "A genetic algorithm tutorial." Statistics and Computing, 4.2 (1994): 65-85.
Wijayasekara et al., "FN-DFE: Fuzzy-neural data fusion engine for enhanced resilient state-awareness of hybrid energy systems." IEEE transactions on cybernetics 44.11 (2014): 2065-2075.
Wu et al., "An expert system for fault diagnosis in internal combustion engines using wavelet packet transform and neural network." Expert systems with applications 36.3 (2009): 4278-4286.
Xiong et al., "Online fault diagnosis of external short circuit for lithium-ion battery pack." IEEE Transactions on Industrial Electronics 67.2 (2019): 1081-1091.
Xu, S., "A survey of knowledge-based intelligent fault diagnosis techniques." Journal of Physics: Conference Series. vol. 1187. No. 3. IOP Publishing, (2019): 1-6.
Yachie-Kinoshita et al., "A metabolic model of human erythrocytes: practical application of the E-Cell Simulation Environment." Journal of Biomedicine and Biotechnology 2010 (2010): 1-15.
Yan, Y., "Sensor placement and diagnosability analysis at design stage." ECAI 2004 MONET Workshop on Model-Based Systems, Valencia, Spain, 2004, NRC Code 47160, pp. 1-5.
Zhang et al., "Robust fault diagnosis of aircraft engines: A nonlinear adaptive estimation-based approach." IEEE Transactions on Control Systems Technology 21.3 (2012): 861-868.
Zhao et al. "Fault detection of batch process based on multi-way Kernel T-PLS." Journal of Chemical and Pharmaceutical Research 6.7 (2014) 338-346.
Zhbanov et al., "Effects of aggregation on blood sedimentation and conductivity." PLoS One 10.6 (2015): 1-25.

* cited by examiner

147

| Deviation strategy matrix 505 | |
|---|---|
|  | $v_1$ |
| $Dclass_0$ | [0] |
| $Dclass_1$ | [0,1] |
| $Dclass_2$ | [0,1,2] |
| $Dclass_3$ | [0,2] |

| Variation strategy matrix 510 | |
|---|---|
|  | $v_1$ |
| $Dclass_0$ | [0] |
| $Dclass_1$ | [0,1] |
| $Dclass_2$ | [0,1,2] |
| $Dclass_3$ | [0,2] |

| Time order strategy matrix 515 | |
|---|---|
|  | $v_1$ |
| $Dclass_0$ | 0 |
| $Dclass_1$ | 1 |
| $Dclass_2$ | 1 |
| $Dclass_3$ | 1 |

PROPAGATION-BASED FAULT DETECTION AND DISCRIMINATION METHOD AND THE OPTIMIZATION OF SENSOR DEPLOYMENT

CROSS-REFERENCE TO RELATED APPLICATIONS

This application is a U.S. National Stage application filed under 35 U.S.C. § 371 of PCT/US2022/015464 filed Feb. 7, 2022, which claims the benefit of priority to U.S. Provisional Application No. 63/171,699 filed Apr. 7, 2021, each of which is hereby incorporated herein by reference in their entirety.

STATEMENT OF GOVERNMENT SUPPORT

This invention was made with government support under grant/contract no. DE-AR0000976 awarded by the Department of Energy. The government has certain rights in the invention.

BACKGROUND

Sensor selection for sensor deployment strategy optimization is critical in designing a high-performance monitoring system for fault detection and isolation. Generally, fault detection and isolation uses the features of system behaviors (signal responses) in the monitored system under nominal and faulty states. At the system design stage, due to the lack of operating data, qualitative or quantitative models are employed for generating the system's behavioral features. However, to cover a wide range of different types of faults and obtain the system behaviors under these faulty states, a large number of simulations based on numerical models (e.g., computational fluid dynamics) are required, which may generate an overwhelming amount of data.

It is with respect to these and other considerations that the various aspects and embodiments of the present disclosure are presented.

SUMMARY

A model is created of a system to be monitored. Operating states of the monitored system, including steady and transient states, are identified. Faults are injected into the model and the model is used to simulate each of the identified operating states. Results of each simulation are analyzed and used to develop one or more propagation-based fault detection and discrimination strategies that can be used to identify faults in each of the identified operating states. The strategies may further be used to select an optimal set of sensors to assist with fault detection.

In an embodiment, a method is provided. The method includes: generating a model of a system by a computing device; simulating the system using the model in each operating state of a plurality of operating states by the computing device; and based on the simulations, generating a propagation-based fault detection and discrimination ("PFDD") strategy for each operating state by the computing device.

Embodiments may include some or all of the following features. The method may further include: determining a current operating state of the plurality of operating states of the system; and detecting and discriminating one or more faults in the system using the PFDD strategy generated for the current operating state. Generating the model may include generating a quantitative model and an algebraic model. The quantitative model may be generated using differential equations. The algebraic model is generated from the quantitative model using discretization methods. Simulating the system using the model in each operating state of a plurality of operating states may include repeatedly simulating the system using the generated algebraic model for a plurality of iterations. A different fault may be introduced into the simulation at each iteration of the plurality of iterations. The plurality of operating states may include steady states and transient states, and generating the PFDD strategy for a transient state may include: generating a plurality of fault feature matrices based on the simulation of the transient state for each of a plurality of faults; determining a plurality of unique subcases for each fault based on the fault feature matrices; defining one or more D-classes for each unique subcase of the plurality of unique subcases; generating a reduced fault feature matrix from the defined one or more D-Classes for each unique subcase of the plurality of unique subcases; generating one or more diagnosis strategies matrices based on the reduced fault feature matrix; and determining the PFDD strategy for the transient state based on the one or more diagnosis strategies matrices. Generating the PFDD strategy for a steady state may include: generating a plurality of fault feature matrices based on the simulation of the steady state for each of a plurality of faults; defining one or more D-classes for each pair of faults of the plurality of faults; generating one or more D-class feature matrices from the defined one or more D-classes; generating one or more diagnosis strategies matrices based on the one or more D-class feature matrices; and determining the PFDD strategy for the steady state based on the one or more diagnosis strategies matrices. Simulating the system using the model in an operating state of the plurality of operating states may include: determining a plurality of faults associated with the system; and for each fault of the plurality of faults, injecting the fault into the model and simulating the system using the model with the injected fault for the operating state. The method may further include: determining one or more propagation features related to each fault of the plurality of faults based on the simulations; and generating the PFDD strategy for each operating state based on the determined one or more propagation features. Generating a PFDD strategy for an operating state may include: generating one or more fault feature matrices for the operating state; generating one or more D-class feature matrices based on the one or more fault feature matrices; generating one or more diagnosis strategy matrices based on the one or more D-class feature matrices; and generating the PFDD strategy for the operating state based on the one or more diagnosis strategy matrices.

In an embodiment, a method is provided. The method may include: generating a model of a system by a computing device, wherein the model includes a plurality of variables; simulating the system using the model in each operating state of a plurality of operating states by the computing device; and based on the simulations, selecting an optimal subset of the plurality of variables.

Embodiments may include some or all of the following features. Simulating the system using the model in an operating state of the plurality of operating states may include: determining a plurality of faults associated with the system; and for each fault of the plurality of faults, injecting the fault into the model and simulating the system using the model with the injected fault for the operating state; and generating one or more fault feature matrices for the operating state. The method may further include selecting the optimal subset of the plurality of variables using the one or more fault feature matrices. The method may further include selecting the optimal subset of the plurality of variables using the one or more fault feature matrices using a genetic algorithm. The method may further include selecting one or more sensors based on the optimal subset of the plurality of variables. The method may further include monitoring one or more signals of the system using the selected one or more sensors.

In an embodiment, a first system is provided. The first system includes at least one computing device; and a computer readable medium storing computer executable instructions that when executed by the at least one computing device cause the at least one computing device to: generate a model of a second system; simulate the second system using the model in each operating state of a plurality of operating states; and based on the simulations, generate a PFDD strategy for each operating state.

Embodiments may include some or all of the following features. The first system may further include computer executable instructions that when executed by the at least one computing device cause the at least one computing device to: determine a current operating state of the plurality of operating states of the second system; and detect and discriminate one or more faults in the second system using the PFDD strategy generated for the current operating state.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 5 is an illustration of an example PFDD strategy;

FIG. 6 is an illustration of example feature matrices;

DETAILED DESCRIPTION

Figure 1:
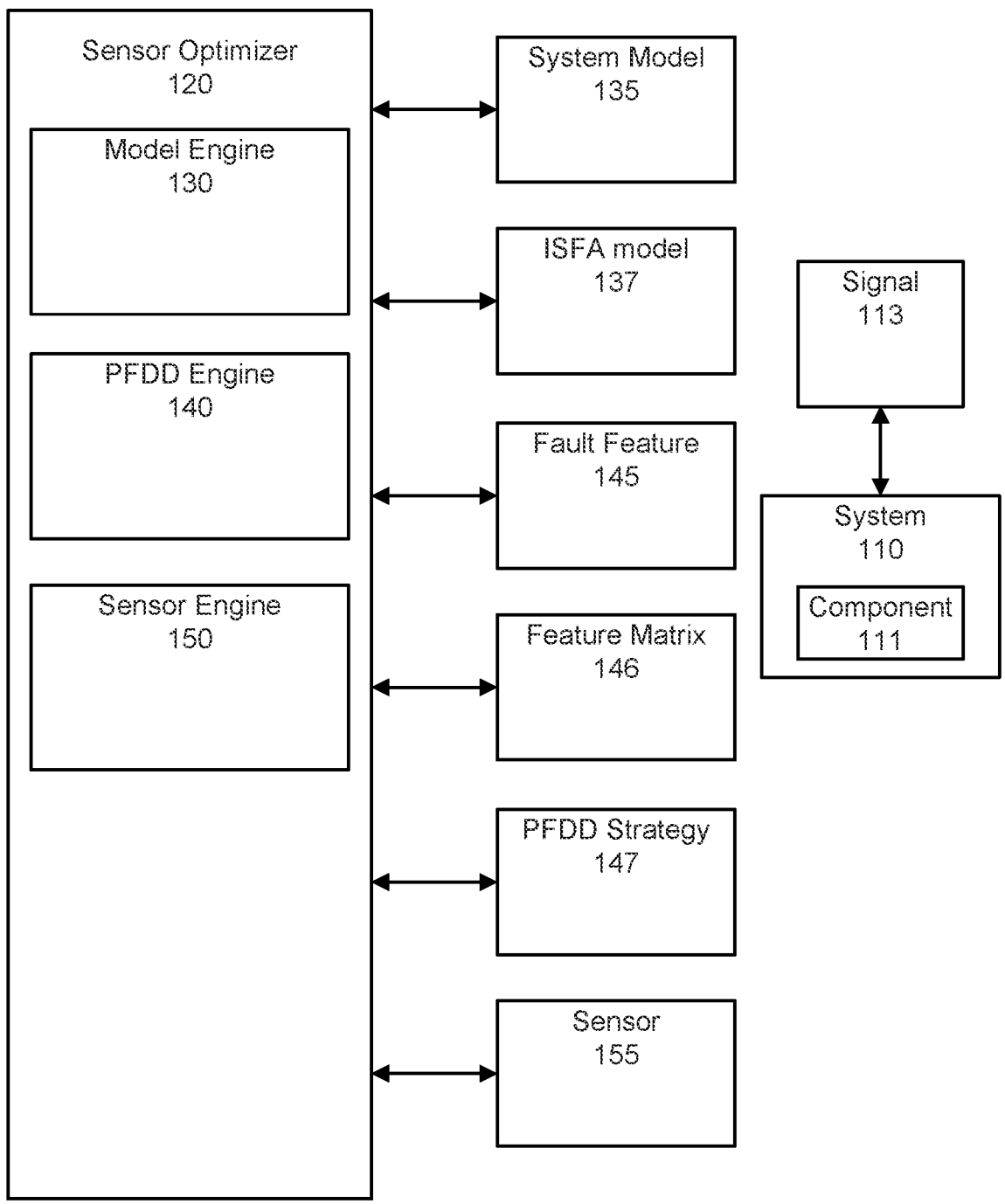
FIG. 1 is an illustration of an environment for creating propagation-based fault detection and discrimination ("PFDD") strategies and for selecting sensors for a monitored system.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an environment 100 for creating propagation-based fault detection and discrimination ("PFDD") strategies and for selecting sensors for a monitored system. As show, the monitored system 110 includes one or more components 111. The one or more components 111 may receive and/or generate one or more signals 113. The signals 113 may include both input signals 113 and output signals 113. In addition, while not shown, each component 111 may receive signals 113 from, and may provide signals 113 to, other components 111 of the system 110. Example systems include industrial systems such as power generation systems. Example signals 113 include signals 113 related to materials (e.g., water), energy, heat, electricity, and fuel. Other types of signals 113 may be supported.

In order to monitor the system 110 and to determine if the system 110 is in a nominal state (i.e., acting or performing as planned) or if the system is in a faulty state (i.e., not acting or performing as planned), the environment 100 may use one or more sensors 155. Each sensor 155 may be capable of measuring one or more signals 113 generated by the components 111 of the system 110. Example of sensors 155 include temperature sensors, pressure sensors, electrical sensors, and optical sensors. Other types of sensors 155 may be supported.

While sensors 155 are an effective way to monitor systems 110, determining the optimal sensors 155 and sensor locations, to perform the monitoring is an ongoing problem. The use of sensors 155 can be expensive in both monitoring and collecting the data generated by the sensors 155, as well as the cost of the sensors 155 themselves.

Accordingly, to determine the amount and placement of sensors 155 needed to monitor a system 110, the environment 100 includes the sensor optimizer 120. The sensor optimizer 120 may select one or more sensors 155 using what is referred to herein as a PFDD method. As shown, the sensor optimizer 120 includes several components including, but not limited to, a model engine 130, a PFDD engine 140, and a sensor engine 150. The sensor optimizer 120, and some or all of the components 130, 140, and 150 may be implemented together or separately using one or more general purpose computing devices such as the computing device 1000 illustrated with respect to FIG. 10.

The model engine 130 may generate one or more models that describe the operation of the monitored system 110. The model engine 130 may generate two types of models, one or more system models 135 and one or more ISFA models 137. A system model 135 of a monitored system 110 may be a complex model that is generated by the model engine 130 using the laws of physics and knowledge about the operation of the one or more components 111 of the system 110. For example, the model engine 130 may use existing materials that describe the components 111 of the system including manuals, schematics, and diagrams. These materials may have been created as part of the creation of the system 110. Depending on the embodiment, the system model 135 may be a quantitative model. Other types of models may be used.

The model engine 130 may generate the ISFA model 137 from the system model 135. The ISFA model 137 may be an algebraic model and may include a variable for each signal 113 and may include linear piecewise approximations representing the changes in the signals 113 of the system 110 under both transient and steady operational states. Depending on the embodiment, the model engine 130 may generate the ISFA model 137 from the system model 135 by running or simulating the model 135 under both transient and operational states. The model engine 130 may record the values of the signals 113 generated by the system model 135 over time and may use the recorded values to generate the ISFA model 137. In some embodiments, the model engine 130 may discretize the system model 135 to create the ISFA model 137. Suitable discretization methods include the Euler method and the Runge-Kutta method. Other discretization methods may be used.

The PFDD engine 140 may use the ISFA model 137 to infer trends of signal changes (i.e., increases or decreases) in different system states. In some embodiments, the signal engine 140 may simulate the system 110 using the ISFA models 137 and may use ISFA to deduce signal changes transferred among the various component 111 of the system 110 during the simulation. Based on the signal changes, trends of signal deviations (e.g., higher or lower than normal) and variations (e.g., increase or decrease) under different fault states can be generated. These trends may be used to determine one or more PFDD strategies 175.

The sensor engine 150 may select a set of sensors 155 that can detect and identify most types of faults in the system 110. In some embodiments, the sensor engine 150 may use an optimization algorithm that chooses the set of sensors 155 that satisfy minimum deployment costs (e.g., the minimum number of sensors 155). In some embodiments, a genetic optimization algorithm is used. Other optimization algorithms may be used. The sensors 155 may be selected based in part on the PFDD strategies 147.

The model engine 130 may create the ISFA model 137 using an iterative process where first an accurate system model 135 is created of the system 110. The system model 135 is used to create the ISFA model 137, and the ISFA model 137 is then evaluated and adjusted as necessary.

In some embodiments, the ISFA model 137 may be generated using an ISFA technique. ISFA is an integrated tool for system modeling and fault analysis. ISFA constructs the ISFA model 137 based on the physical rules among system 110 components 111 and the logic among system functions. ISFA performs the failure analysis of hardware and software systems during the design stages of that system 110.

The ISFA model 137 consists of two parts: a component model and a function model. The component model defines the components 111 in a system 110 and depicts their connections. The function model defines the functions of the components 111 and the system 110.

For each component 111, ISFA uses behavioral rules ("BR") derived from qualitative physics to define components' behaviors in the normal and faulty conditions qualitatively. A functional failure logic ("FFL") may be defined for each function to infer the state of that function based on the states of components and infer the state of system functions. The simulation of an ISFA model 137 is a discrete-time simulation integrated with an automatic reasoning capability. When a fault is injected into a component 111 of the ISFA model 137, the behavioral rules of the component 111 are executed. Based on the links between components 111, the behavioral rules of the related components are executed in sequence. Concurrently, the functional states of the components 111 and the system 110 (e.g., operational, degraded, or lost) are assessed by the FFLs. The propagation path of the fault, the set of components 111 affected by the fault, and the abnormal behaviors of the affected components 111 are attained through the simulation process. The qualitative values of system variables in the fault condition are analyzed and compared with those in the normal condition.

The outputs of the simulation of the ISFA model 137 are the effects of faults through the components 111 of the system 110. The PFDD engine 140 (described further below) utilizes these outputs to generate one or more fault features 145. In some embodiments, the fault features 145 may be two lists of vectors. The first list of vectors is a list of deviation index vectors. A deviation index is the direction of the deviation of a variable at a time point in the simulation process of a fault. For example, if a tank is leaking, its water level is decreasing. There is a negative deviation of the water level from its expected value. The deviation index for the water level is "negative". A deviation index vector lists the deviation index of the variable at all time points during a simulation of the system 110. The fault features 145 includes deviation index vectors of all system variables of the ISFA model 137.

The second list of vectors in the fault features 145 is a list of variation index vectors. A variation index is the trend of the variation of a variable at a time point in the simulation process. A variation index vector lists the variation index of the variable at all time points. The second output lists the variation index vectors of all system variables.

An ISFA model 137 can be simulated by the PFDD engine 140 in both steady states and transient states. When simulating the ISFA model 137, the PFDD engine 140 may inject a fault into the simulation. The injected fault may reveal the propagation features of related to the injected fault. These propagation features may be used to detect and discriminate system faults by the PFDD engine 140, and to ultimately select sensors 155 by the sensor engine 150.

In some embodiments, the variables of a system 110 are the measurable quantities that characterize the state of a system (e.g., the pressure of a vessel, and the temperature of the water in a tank). These variables may correspond to the signals 113 of the components 111.

In the ISFA model 137, the complete set of variables identified in the system 110 is denoted as CV. CV consists of the set of observable variables V and the set of unobservable variables U. Assume that sensors 155 have been placed to monitor a set of observable variables which are $\{v_1, v_2, v_i \ldots, v_m\}$. The m variables are called observed variables. The observations of the m variables are used to detect and discriminate faults. The m variables are denoted in a vector $\vec{v}=[v_1, v_2, \ldots v_i \ldots, v_m]$ where $i \in [1, m]$.

A system fault or fault may be defined as the failure of one or multiple system components 111 at the same time. Assume that the system 110 is subjected to n potential faults which are $\{f_1, f_2, \ldots f_j \ldots, f_n\}$. In the ISFA model 137 model, the system 110 is simulated in the fault $f_j$ condition if a fault $f_j$ is injected into the system 110. The system 110 is in normal condition if there is no fault injected. In order to simplify the expression, the fact that no fault is in the system 110 may be generalized as a special "fault" $f_0$. The fault $f_0$ condition is equivalent to the normal condition. The potential faults $\{f_1, f_2, \ldots f_j \ldots, f_n\}$ and the generalized fault $f_0$ can be denoted in a fault vector $\vec{f}=[f_0, f_1, \ldots f_j \ldots, f_n\sim]$ where $j \in [0, n]$.

The PFDD engine 140 may identify the operating states of the system 110. The system 110 has steady states and transient states. A steady state is a state where system variables do not change over time. In a transient state, at least one variable changes over time. If the system 110 is in a steady state, the system behaviors in a fault condition do not depend on the time at which the fault is injected. If the system 110 is in a transient state, the system may behave differently when a fault occurs at a different time of the transient state.

The PFDD engine 140 may simulate the system 110 in each operating state using the ISFA model 137 for each fault condition. In each simulation, the PFDD engine 140 assesses the qualitative value of each system 110 variable at a series of discrete time points. The time points at which the model is simulated as a time vector $\vec{t}=[t_1, t_2, \ldots t_q \ldots, t_p]$ where $q \in [1, p]$. If the model 137 is simulated with the fault $f_j$ condition, the qualitative value of a variable $v_i$ at a time point $t_q$ is represented as $v_j^i(t_q)$. Each simulation outputs a list of deviation index vectors and a list of variation vectors (i.e., the fault features 145) which are defined below.

The deviation of a variable is the difference between its value in a fault condition and its value in the normal condition. Since the ISFA model 137 simulates the system 110 qualitatively, the deviation of a variable in a fault condition is represented using a deviation index.

The deviation index $\theta_j^i(t_q)$ represents the direction of the deviation of a variable $v_i$ in the fault $f_j$ condition at the time point $t_q$. The deviation index $\theta_j^i(t_q)$ is defined in equation (1) where $\varepsilon$ is a pre-defined threshold.

$$\theta_j^i(t_q) = \begin{cases} 0, & \text{if } v_j^i(t_q) \in [v_0^i(t_q) - \varepsilon, v_0^i(t_q) + \varepsilon] \\ 1, & \text{if } v_j^i(t_q) \in (v_0^i(t_q) + \varepsilon, +\infty) \\ 2, & \text{if } v_j^i(t_q) \in (-\infty, v_0^i(t_q) - \varepsilon) \end{cases} \quad (1)$$

The deviation index vector Of consists of the deviation indexes of a variable $v_i$ at all time-points in the fault $f_j$ condition and can be denoted as $\vec{\theta}_j^i=[\theta_j^i(t_1), \theta_j^i(t_2), \ldots, \theta_j^i(t_q) \ldots \theta_j^i(t_p)]$.

An example of deviation index vector for $v_i$ is [0, 0, 1, 1, 2, 2], which tells that the variable does not change at the first two points, then its values are higher than the expected value at the following two time points. The values of the variable $v_i$ are below the expected values at the last two time points.

The deviation index vector of $v_i$ in the normal condition (fault $f_0$ condition) is $\vec{\theta}_0^i=[\theta_0^i(t_1), \theta_0^i(t_2), \ldots, \theta_0^i(t_q), \ldots, \theta_0^i(t_p)]$ where $\theta_0^i(t_q)=0$ for all $q \in [1,p]$.

The variation of a variable at a time point is defined as the difference between its value at the current time point and that at the previous time point. The variation index is used to qualitatively represent the trend of the variation of a variable.

The variation index of $\delta_j^i(t_q)$ represents the trend of the variation of a variable $v_i$ at the time point $t_q$ in a fault $f_1$ condition. The variation index sf $(t_q)$ is defined by comparing $v_j^i(t_q)$ and $v_j^i(t_{q-1})$ as equation (2) where $\varepsilon$ is a pre-defined threshold and $v_j^i(t_0)$ is the initial value of the variable $v_i$ in the fault $f_1$ condition.

$$\delta_j^i(t_q) = \begin{cases} 0, & \text{if } v_j^i(t_q) \in [v_j^i(t_{q-1}) - \varepsilon, v_j^i(t_{q-1}) + \varepsilon] \\ 1, & \text{if } v_j^i(t_q) \in (v_j^i(t_{q-1}) + \varepsilon, +\infty) \\ 2, & \text{if } v_j^i(t_q) \in (-\infty, v_j^i(t_{q-1}) - \varepsilon) \end{cases} \quad (2)$$

The variation index vector $\vec{\delta}_j^i$ consists of the variation index of the variable $v_i$ at all time points in a fault $f_j$ condition, i.e., $\vec{\delta}_j^i=[\delta_j^i(t_1), \delta_j^i(t_2), \ldots, \delta_j^i(t_q) \ldots \delta_j^i(t_p)]$.

Given an operating state, the PFDD engine 140 generates the deviation index vectors and variation index vectors are for all variables in each fault condition as the fault features 145. The PFDD engine 140 may use the fault features 145 to develop the PFDD strategies 147 for the system.

To ensure that the PFDD 147 strategies developed by the PFDD engine 140 are effective, the deviation and variation index vectors generated in each fault condition shall be accurate (i.e., consistent with experimental data or data generated by a high-order system model 135 which is time consuming for simulation). Given an ISFA model 137, the accuracy of results obtained through its simulation is significantly impacted by the pre-defined threshold E.

The PFDD engine 140 may generate a plurality of PFDD strategies 147 for each operating state of the of the system 110. The PFDD engine 140 may use a different method to generate the PFDD strategy 147 for an operating state depending on whether the operating state is a steady state or a transient state.

If the system 110 is in a steady state, the behaviors of the system 110 in a fault condition do not depend on the time at which the fault is injected. Assuming that a fault is injected at the time point $t_1$ in the simulation process, in each fault condition, the deviation index vectors and variation index vectors can be generated by the PFDD engine 140 simulating the ISFA model 137.

From those vectors of the fault features 145, a set of features of system variables are extracted to characterize the process of propagation of the fault. The propagation features of system variables used herein include 1) the directions by which the system variables deviate from their expected values, 2) the trends with which the system variables vary over time, and 3) the order in which each variable is influenced during the propagation of a fault.

The fault features 145 of all system variables in all fault conditions are summarized using three fault feature matrices 146 which are the deviation mode matrix, variation mode matrix, and time order matrix. The criteria by which a fault can be detected and discriminated in a steady state are formulated using those matrices. The PFDD strategy 147 in a steady state is then developed accordingly.

The deviation mode matrix summarizes the directions by which the system variables deviate from their expected values in all fault conditions. The deviation mode matrix is constructed based on the deviation index vectors from the fault features 145. The procedure used to construct the deviation mode matrix is described below.

A deviation index vector $\vec{\theta}_j^i$ may contain a series of consecutive repetitive deviation indexes if the variable $v_i$ has the same direction of deviation over a period of time for the fault $f_j$. condition. For example, a deviation index vector $\vec{\theta}_j^i=[0, 0, 1, 1, 2, 2]$ which tells that the variable does not deviate from normal in the first two time points, deviates positively from normal in the next two time points and deviates negatively from normal in the last two time points. However, the time points do not represent the accurate time in a real system. The consecutive repetition of a deviation index does not provide more information than a single deviation index in terms of direction of deviation. To abstract the main deviation features of a deviation index vector, the deviation feature vector and derivation mode are defined.

A deviation feature vector $\vec{d}_j^i$ abstracts the main deviation features of the variable $v_i$ in the fault $f_j$ condition by merging the consecutive repetitive deviation indexes in $\vec{\theta}_j^i$. Vector $\vec{d}_j^i$ can be generated from $\delta_j^i$ using a duplication removal function $F_{DR}(\vec{\theta}_j^i)$ as given in Equation (3) where $F_{DR}(\vec{\theta}_j^i)$ removes the elements in $\vec{\theta}_j^i$ whose value is equal to its left side neighbor. For example, the deviation feature vector $\vec{d}_j^i$ for the deviation index vector $\vec{\theta}_j^i=[\theta, 0, 1, 1, 2, 2]$ is $\vec{d}_j^i=[\theta, 1, 2]$.

$$\vec{d}_j^i = F_{DR}(\vec{\theta}_j^i) = [\theta_j^i(t_{q_1}), \theta_j^i(t_{q_2}), \ldots \theta_j^i(t_{q_x}), \ldots, \theta_j^i(t_{q_y})], x \in [1, y] \quad (3)$$

Each deviation index vector generates a deviation feature vector. Since the length of different deviation feature vectors might be different, the deviation mode is defined to simplify and unify the representations of the deviation feature vectors.

A deviation mode is a positive integer used to represent a deviation feature vector. The deviation mode $D_j^i$ is used to represent the deviation feature vector $\vec{d}_j^i$. $D_j^i$ can be calculated using equation (4).

$$D_j^i = \sum_{x=1}^{y} \theta_j^i(t_{q_x}) * 3^{y-x} \quad (4)$$

Since $\theta_j^i(t_{q_x}) \in \{0, 1, 2\}$, $\vec{d}_j^i$ can be regarded as a ternary integer, equation (4) essentially calculates the decimal value of $\vec{d}_j^i$. The deviation mode has the following features: 1) the deviation modes of two different deviation feature vectors are different, 2) the deviation mode of the normal condition (i.e. $\vec{d}_0^i=[0]$) is $D_0^i=0$, 3) given a deviation mode, the associated deviation feature vector can be generated by converting the decimal value of the deviation mode to the ternary value. Given the deviation mode of all variables in all fault conditions, a deviation mode matrix can be constructed by the PFDD engine 140.

The deviation mode of all variables in all fault conditions can be collected in a (n+1)×m deviation mode matrix D, where $D_j^i$ is the deviation mode of the variable $v_i$ in the fault $f_j$ condition, n+1 is the number of faults in $\vec{f}$ (including n faults and the normal condition $f_0$), m is the number of observed variables in $\vec{v}$. It should be noted that $D_0^i=0$ for all $i \in [1, m]$ since $f_0$ is the normal condition.

The variation mode matrix summarizes the trends with which the system 110 variables vary overtime in all fault conditions. The variation mode matrix may be constructed by the PFDD engine 140 based on the variation index vectors of the fault features 145. The procedure followed to construct the variation mode matrix is described below.

For each variation index vector, a variation feature vector is first generated to abstract the main variation features. A variation feature vector $\vec{c}_j^i$ abstracts the main variation features of the variable $v_i$ in the fault $f_j$ condition by merging consecutive repetitive deviation indexes in $\delta_j^i$, $\vec{c}_j^i$ can be defined using the duplication removal function as defined in equation (5).

$$\vec{c}_j^i = F_{DR}(\vec{\delta}_j^i) = [\delta_j^i(t_{q_1}), \delta_j^i(t_{q_2}), \ldots \delta_j^i(t_{q_x}), \ldots, \delta_j^i(t_{q_y})], x \in [1, y] \quad (5)$$

The variation mode is then defined to simplify and unify the representations of the variation feature vectors. A variation mode $C_j^i$ is an integer used to represent the variation feature vector $\vec{c}_j^i$. $C_j^i$ can be calculated using the equation (6).

$$C_j^i = \sum_{x=1}^{y} \delta_j^i(t_{q_x}) * 3^{y-x} \quad (6)$$

The variation mode has the following features: 1) the variation modes of two different variation feature vectors are different, 2) given a variation mode, the associated variation feature vector can be generated by converting the decimal value of the variation mode to the ternary value. Given the variation mode of all variables in all fault conditions, the variation mode matrix can be constructed.

The variation mode of all variables in all fault conditions can be displayed in a (n+1)×m matrix C, where $C_j^i$ is the variation mode of the variable $v_i$ in the fault $f_j$ condition. Based on the definition of deviation mode and variation mode, a proposition 1 is defined that can be used later to define the criteria for fault detection and discrimination: If the variation mode of a variable $v_i$ in the fault $f_j$ condition is not equal to its variation mode in the normal condition, the deviation mode of $v_i$ in the fault $f_j$ condition is not zero (i.e., If $C_j^i \approx C_0^i$, then $D_j^i \approx 0$).

When a fault $f_j$ occurs in the system 110, variables start to deviate in a particular sequence as the fault propagates. The chronological order in which the variables start to deviate during the process of propagation of the fault $f_j$ can also be used to discriminate $f_j$ from the other faults. The time order matrix is introduced further below.

Figure 2:
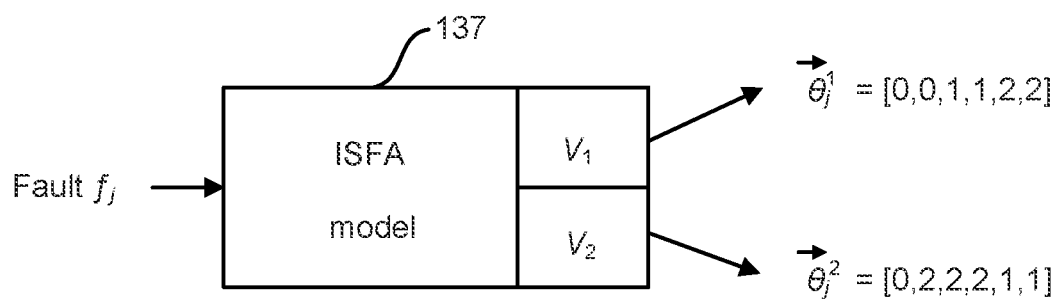
FIG. 2 is an illustration of an example Integrated System Failure Analysis ("ISFA") model.

FIG. 2 is used as an illustrative example. In FIG. 2, two variables, i.e. $v_1$ and $v_2$, are defined in an ISFA model 137. In the fault $f_j$ condition, the deviation index vectors for the two variables are: $\vec{\theta}_j^1=[\theta, 0, 1, 1, 2, 2]$, $\vec{\theta}_j^2=[0, 2, 2, 2, 1, 1]$.

To obtain the time order of the variables, the time point at which a variable starts to deviate from normal is first identified by the PFDD engine 140. The deviation start time of a variable is defined below.

The deviation start time $o_j^i$ is the index of the time point at which the variable $v_i$ starts to deviate in the fault $f_j$ condition. $o_j^i$ can be obtained based on the deviation index vector $\vec{\theta}_j^i$ as defined in equation (7).

$$o_j^i = \begin{cases} q & \text{if } t_q \text{ is the first time point at which } \theta_j^i(t_q) \neq 0 \\ +\infty & \text{if } \forall x \in [0, p] \theta_j^i(t_x) = 0 \end{cases} \quad (7)$$

For the example ISFA model 137 of FIG. 2, the deviation start time of the two variables are $o_j^1=3$ and $o_j^2=2$ since $v_1$ and $v_2$ start to deviate at the third time point and the second time point respectively.

Given the deviation start time of all variables in a fault condition, the order in which all variables start to deviate can be obtained by the PFDD engine 140. The time order of each variable is defined below.

The time order of a variable $v_i$ in the fault $f_j$ condition is denoted as $O_j^i$ where $O_j^i-1$ is the number of variables that start to deviate before $v_i$ starts to deviate. In the example of FIG. 2, the time order of variable $v_1$ is $O_j^1=2$. The time order of variable $v_2$ is $O_j^2=1$. The time order of a variable $v_1$ in the normal condition is $O_0^i=0$. Given the time order of all variables in all fault conditions, the time order matrix can be constructed.

Time order matrix O is a (n+1)×m matrix, where $O_j^i$ is the time order of variable $v_i$ in the fault $f_j$ condition. The following proposition 2 can be derived based on the definition of time order. If there exists a variable $v_i$ that has the feature $O_{j_1}^i \approx O_{j_2}^i$, the faults $f_{j_1}$ and $f_{j_2}$ can be discriminated from each other. The criteria necessary and sufficient for a fault to be detected are given in the following proposition 3. A fault $f_j(j \in [1, n])$ can be detected if and only if $\exists i \in [1,m]$ such that $D_j^i \approx 0$.

Faults can be discriminated using the fault feature matrices, i.e., D, C, and O. The following proposition 4 defines the criteria under which a fault can be discriminated.

Two faults $f_{j_1}$ and $f_{j_2}$ ($j_1, j_2 \in [1, n]$) can be discriminated from each other if and only if $\exists i \in [1, m], O_{j_1}^i \approx O_{j_2}^i$ or $D_{j_1}^i \approx D_{j_2}^i$ or $C_{j_1}^i \approx C_{j_2}^i$.

Based on proposition 4, two faults can be discriminated from each other as long as there is a variable whose deviation mode, variation mode, or time order is different in the two fault conditions. The following proposition 5 integrates the criteria under which a fault can be detected and discriminated. Detecting a fault is equivalent to discriminating a fault from the normal condition. (i.e., a fault $f_j$ can be detected if and only if it can be discriminated from $f_0$).

Based on proposition 5, detection and discrimination of a fault $f_j(j \in [1, n])$ is equivalent to discriminating $f_j$ from all the other faults in $\vec{f}$ (including $f_0$). Since there may be faults that cannot be discriminated from each other, the discrimination classes of the faults are defined to classify the non-distinguishable faults.

A D-class in a steady state is a set of faults in $\vec{f}$ that cannot be discriminated from each other. The number of D-classes in the steady state can be denoted as $\eta$. In a steady state, all faults that cannot be discriminated from each other are placed in one D-class. A fault $f_j$ in the D-class that contains $f_0$ is not detectable. The number of D-classes of a system in a steady state is determined by the system's capability of detecting and discriminating faults in the steady state.

The measure equivalence level of a system is defined below and used to quantify the capability of PFDD engine 140 in detecting and discriminating faults. The equivalence level of a system in a steady state is the number of faults that are not detectable or discriminable. It is defined as $e=n+1-\eta$ where n+1 is the number of faults in $\vec{f}$, and $\eta$ is the number of D-classes.

Based on the criteria of detecting and discriminating a fault, the PFDD engine 140 may generate a PFDD strategy 147 in three steps. In a first step, the PFDD engine 140 may generate the D-class feature matrices based on fault feature matrices. In a second step, the PFDD engine 140 may generate the diagnosis strategy matrices based on the D-class feature matrices. Finally, in a third step the PFDD engine 140 may determine the PFDD strategy 147 using the diagnosis strategy matrices.

With regards to the first step of generating the D-class feature matrices, proposition 4 specifies that any two faults $f_{j_1}$ and $f_{j_2}$ ($j_1, j_2 \in [1, n]$) in the same D-class satisfy the property that $\forall i \in [1, m], O_{j_1}^i = O_{j_2}^i, D_{j_1}^i = D_{j_2}^i$ and $C_{j_1}^i = C_{j_2}^i$ i.e. the rows of $f_{j_1}$ and $f_{j_2}$ in the fault feature matrices are equivalent. The dimension of the fault feature matrices can be reduced by merging the faults in the same D-class. The outputted matrices are called D-class feature matrices including the D-class deviation mode matrix, D-class variation mode matrix, and D-class time order matrix.

Figure 3:
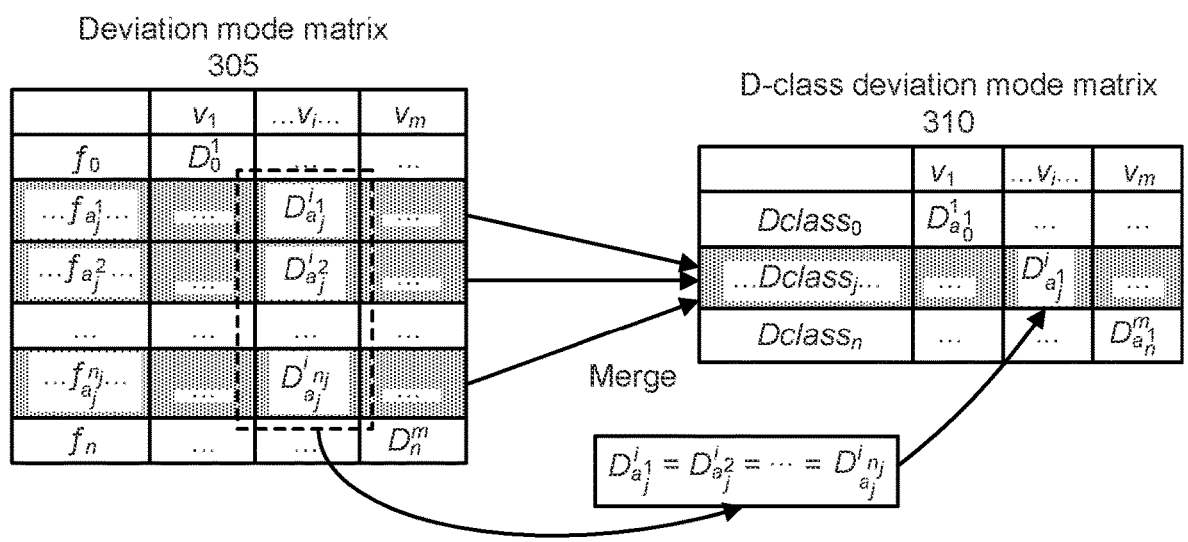
FIG. 3 is an illustration of a discrimination class ("D-class") derivation mode matrix generated from a deviation mode matrix.

FIG. 3 is an illustration of a D-class derivation mode matrix 310 generated from a deviation mode matrix 305. Given the deviation mode matrix 305 on the left, the D_class$_j$ consists of the faults $f_{a_j^1}, f_{a_j^2}, \ldots f_{a_j^{\eta_j}}$, where $\eta_j$ is the number faults in D_class$_j$. Then, the deviation mode of a variable $v_i$ in any fault condition of D_class$_j$ is $D_{a_j}^i$ since $D_{a_j^1}^i = D_{a_j^2}^i = \ldots = D_{a_j^{\eta_j}}^i$. The rows of the faults $f_{a_j^1}, f_{a_j^2}, \ldots f_{a_j^{\eta_j}}$ in the deviation mode matrix 305 are merged in the D-class deviation mode matrix 310. In a D-class deviation mode matrix, each row represents a D-class, and each column is a variable. The D-class variation mode matrix and D-class time order matrix can be obtained following the same approach.

With regards to the second step of generating the diagnosis strategy matrices, a deviation/variation mode is a compressed representation of a deviation/variation feature vector. Introducing the deviation modes and variation modes can reduce the amount of computation required to determine D-classes. However, the deviation modes and variation modes in the D-class feature matrices cannot be used directly for fault diagnosis in operation.

In the second step, the PFDD engine 140 may generate the diagnosis strategy matrices by converting the deviation modes and variation modes in the D-class feature matrices back to the corresponding deviation feature vectors and variation feature vectors based on equation (4) and equation (6). The generated diagnosis strategy matrices can be used directly by the PFDD engine 140 for PFDD strategy 147 generation.

Figure 4:
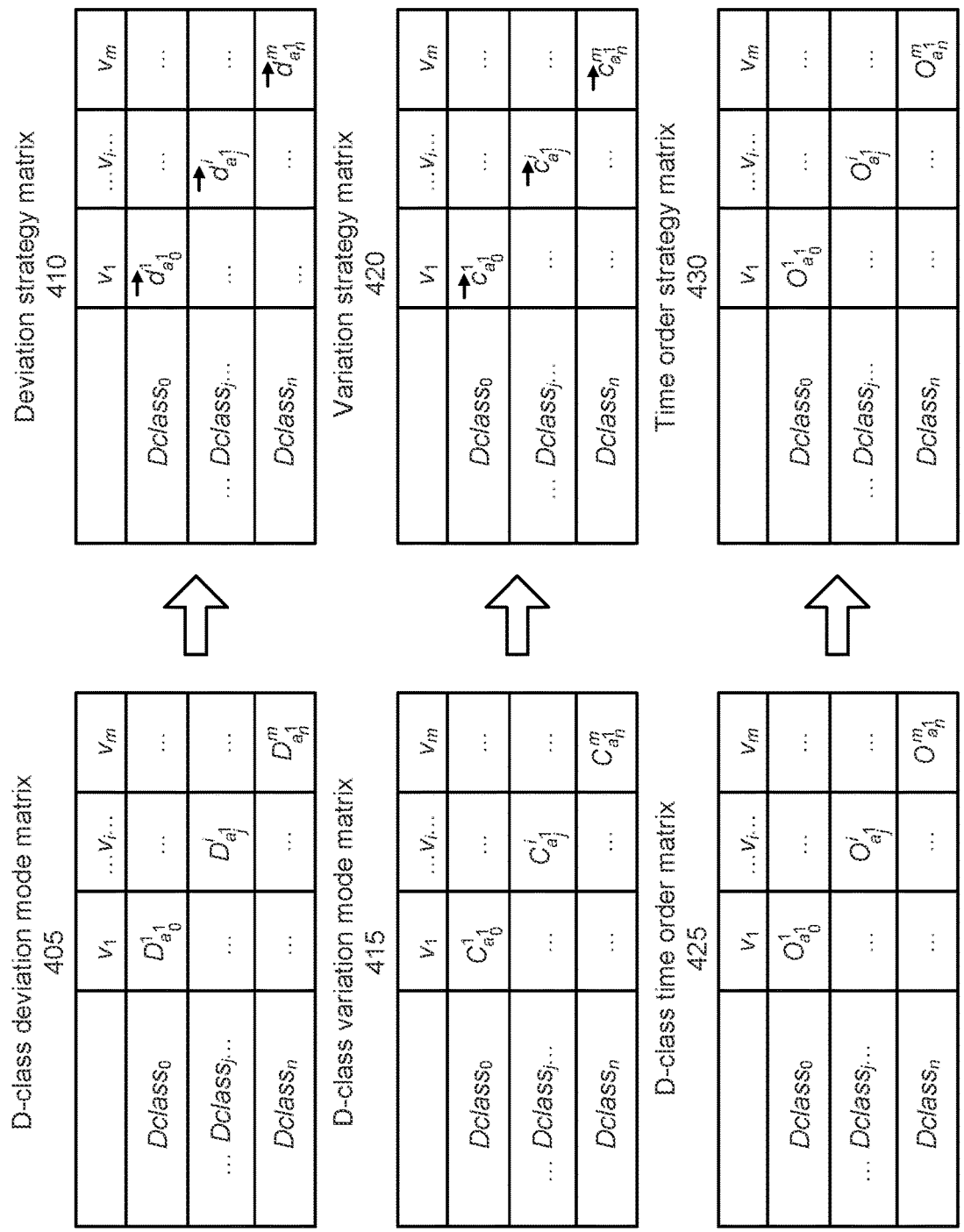
FIG. 4 is an illustration of the generation of the diagnosis strategy matrices including a deviation strategy matrix, a variation strategy matrix, and a time order strategy matrix.

FIG. 4 is an illustration of the generation of the diagnosis strategy matrices including a deviation strategy matrix 410, a variation strategy matrix 420, and a time order strategy matrix 430. As shown, the deviation strategy matrix 410 is generated from a D-class deviation mode matrix 405, the variation strategy matrix 420 is generated from a D-class variation mode matrix 415, and the time order strategy matrix 430 is generated from a D-class time order matrix 425.

In the third step, the PFDD engine 140 may generate the PFDD strategy 147 for the steady operational state from the diagnosis strategy matrices. The deviation index vectors and variation index vectors of system variables can be obtained in real-time using the sampled signals and the predicted values of each variable. Once a deviation is observed, the deviation feature vector, variation feature vector, and time order of the variables under the current operational state can be calculated and compared with each row of the diagnosis strategy matrices.

The deviation feature vector, variation feature vector, and time order of a variable $v_i$ may be defined under the current operational state as $\vec{d}^{*i}$, $\tilde{c}^{*i}$, and $\tilde{O}^i$. In the deviation strategy matrix, if $\vec{d}^{*i}$ does not match the pre-defined deviation feature vector $\vec{d}_{a_j}^i$, D_class$_j$ can be eliminated from the diagnosis. D_class$_j$ can also be eliminated from the diagnosis if $\tilde{c}^{*i}$ does not match $\vec{c}_{a_j}^i$ in the variation strategy matrix or $\tilde{O}^i$ is not equal to $\tilde{O}_{a_j}^i$ in the time order strategy matrix. The features $\vec{d}^{*i}$, $\tilde{c}^{*i}$, and $\tilde{O}^i$ of all observed variables are updated as time proceeds. Only one D-class will remain. The PFDD engine 140 may then determine that the system 110 suffers a fault in that D-class.

FIG. 5 is an illustration of an example PFDD strategy 147. As shown, the strategy includes several diagnosis strategy matrices including a deviation strategy matrix 505, a variation strategy matrix 510, and a time order strategy matrix 515. The system 110 corresponding to FIG. 5 has one observed variable $v_1$ and is subjected to three faults $f_1$, $f_2$, and $f_3$. In FIG. 5, the D-class 0 includes only $f_0$ (i.e. the normal condition), D-class 1 consists of $f_1$, D-class 2 consists of $f_2$, and D-class 3 consists of $f_3$.

Assuming that that the system corresponding to FIG. 5 samples the signals of $v_1$ every second, in the first 3 seconds, no abnormality is observed. At the fourth second, a negative deviation and variation of $v_1$ is observed. The deviation index vector and variation index vector observed are [θ, 0, 0, 2] and [θ, 0, 0, 2]. The deviation feature vector, variation feature vector, and time order of the variable $v_1$ under the current condition are $\vec{d}^1=[0,2]$, $\vec{d}^1=[0,2]$, and $\tilde{O}^1=1$. By comparing $\vec{d}^1$, $\vec{c}^1$, and $\tilde{O}^1$ to each row of the matrices in FIG. 5, D-class 0 is first excluded from the diagnosis since $\vec{d}^1=[0,2]$ will not match the pre-defined deviation feature vector $\vec{d}_1^{\,1}=[0]$ and $\vec{c}^1=[0,2]$ will not match $c_1^{\,1}=[0]$. D-class 1 and D-class 2 are excluded for the same reason. Therefore, the system must be suffering from a fault in D-class 3. Since there is only one fault in D-class 3, the system 110 may be diagnosed with in a fault $f_3$ condition.

Overall, the PFDD strategy 147 for a steady state condition can be generated as follows. 1. Construct the ISFA model 137 for the steady state condition. 2. Simulate the ISFA model 137 with each fault injected into the model 137. 3. Generate the fault features matrices from the results of the stimulation. 4. Define the D-classes of the system faults based on proposition 4 and proposition 5 by examining the discriminability of each pair of faults. 5. Derive the D-class feature matrices from the D-classes. 6. Derive the diagnosis strategy matrices from the D-class feature matrices. 7. Determine the PFDD strategy 147 from the D-class feature matrices.

The PFDD engine 140 may further generate a PFDD strategy 147 when the system 110 is in a transient state. The ISFA model 137 allows simulation in a transient state. The time points at which the ISFA model 137 is simulated may be denoted as a time vector $\vec{t}=[t_1, t_2, \ldots, t_q, \ldots, t_p, \ldots, t_{p'}]$. The transient state starts at $t_1$ and ends at $t_p$, if no fault is injected. The model 137 operates in a steady state after the time point $t_p$.

A fault $f_j$ can be injected by the PFDD engine 140 at a time point $t_q (q \in [1, p'])$ in the transient state. The results of the simulation provide the features of system 110 variables when the fault $f_j$ occurs at $t_q$. In a transient state, the features of system 110 variables after injecting $f_j$ depend on the time at which $f_j$ is injected. The results of simulation may vary if the fault $f_j$ is injected at a different time point. Hence, the fault $f_j$ may be injected into the model 137 at a series of time points of the transient state to uncover the possible behaviors of the system 110 when the fault occurs in the transient state. The subcases of a fault condition are defined below to represent the specific cases in which the fault is injected at different time points.

The system 110 is simulated by the PFDD engine 140 in the subcase $^j f_q$ (of the fault $f_j$ condition) if a fault $f_j$ is injected at the time point $t_q$ in a transient state. When $f_j$ is injected at the time points $[t_{q1}, t_{q2}, \ldots, t_{qk}, \ldots, t_{qs}]$ in the transient state where $k \in [1, s]$, s is the number of subcases of the fault $f_j$ condition. The system 110 is simulated in the following subcases: $[^j f_{q1}, ^j f_{q2}, \ldots, ^j f_{qk}, \ldots, ^j f_{qs}]$.

The results of simulation are generated in each subcase of each fault condition. The fault feature matrices can be constructed accordingly. The fault feature matrices in a transient state are defined below.

The outputs of simulating the ISFA model 137 in a subcase $^j f_{qk}$ ($k \in [1, s]$ and $j \in [1, n]$) can be used to derive the deviation modes, variation modes, and time orders of all variables for the subcase $^j f_{qk}$ following the same steps as described previously with respect to the steady or non-transient operational state.

The deviation mode matrix can be constructed by the PFDD engine 140 given the deviation mode of the variables in each subcase of each fault condition. The deviation mode matrix in a transient state is defined below and illustrated in FIG. 6 as the deviation mode matrix 605.

A deviation mode matrix in a transient state is also denoted as D. It describes the deviation modes of all variables in all subcases of all fault conditions. D is a $((n+1) \cdot s) \times m$ matrix where $n+1$ is the number of faults in $\vec{f}$, s is the number subcases of each fault and m is the number of variables. In the deviation mode matrix 605 displayed of FIG. 6 an element $D_{k+j \cdot s}^{\,i}$ represents the deviation mode of the variable $v_i$ in the subcase $^j f_{qk}$.

Figure 6:
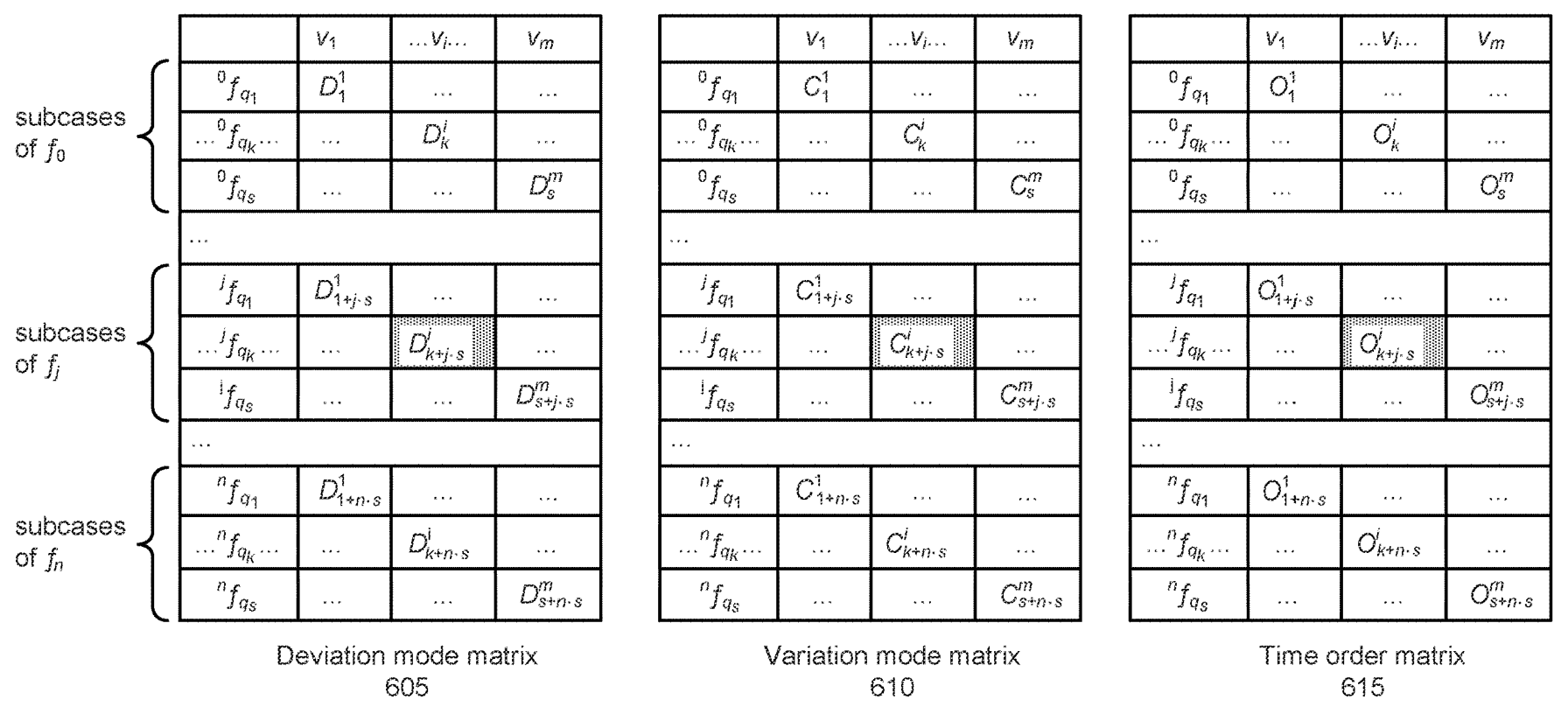

The variation mode matrix and time order matrix can be constructed by the PFDD engine 140 using the variation mode and time order of the variables in each subcase of each fault condition. The variation mode matrix and the time order matrix are defined below and are illustrated in FIG. 6 as the variation mode matrix 610 and the time order matrix 615.

In a transient state, the variation mode matrix C is also a $((n+1) \cdot s) \times m$ matrix. $C_{k+j \cdot s}^{\,i}$ is the variation mode of the variable $v_i$ in the subcase $^j f_{qk}$. The time order matrix O is a $((n+1) \cdot s) \times m$ matrix where $O_{k+j \cdot s}^{\,i}$ is the time order of the variable $v_i$ in the subcase $^j f_{qk}$.

Detection of a fault in a transient state is detecting the subcases of the fault conditions. Given the fault feature matrices, the criteria used to detect a subcase of a fault condition in a transient state can be defined. A subcase $^j f_{qk}$ is detectable if and only if $\exists i \in [1, m]$ such that $D_{k+j \cdot s}^{\,i} \approx 0$. It should be noted that a fault $f_j$ could be detectable in some subcases and not detectable in the other subcases.

Discrimination of a fault in a transient state is to discriminate a subcase of the fault condition from the subcases of the other fault conditions. The criteria used to discriminate two subcases in a transient state are given as: Two subcases $^{j1} f_{qk_1}$ and $^{j2} f_{qk_2}$ can be discriminated from each other if and only if $\exists i \in [1, m]$, $O_{k_1+j_1 \cdot s}^{\,i} \not\approx O_{k_2+j_2 \cdot s}^{\,i}$ or $D_{k_1+j_1 \cdot s}^{\,i} \not\approx D_{k_2+j_2 \cdot s}^{\,i}$ or $C_{k_1+j_1 \cdot s}^{\,i} \not\approx C_{k_2+j_2 \cdot s}^{\,i}$.

Since the goal is to discriminate faults, the PFDD engine 140 only need to discriminate the subcases of different fault conditions. If two subcases of a fault $f_j$ condition cannot be discriminated from each other, one subcase is considered to be redundant. Consider the subcases of a fault $f_j$ condition (i.e., $\{^j f_{q1}, ^j f_{q2} \ldots, ^j f_{qk}, \ldots, ^j f_{qs}\}$). A unique subcase set of the fault condition can be generated by removing the redundant subcases.

The unique subcase set of a fault $f_j$ is denoted as $$U_j = \left\{ ^j f_{q_{k_1^j}}, ^j f_{q_{k_2^j}}, \ldots, ^j f_{q_{k_x^j}}, \ldots, ^j f_{q_{k_y^j}}, \ldots, ^j f_{q_{k_{z_j}^j}} \right\}$$

where 1) $z_j$ is the number of elements in $U_j$; 2) $\forall x, y \in [1, z_j]$ and $$x \neq y, {}^j f_{q_{k_x}^j}$$

can be discriminated from $${}^j f_{q_{k_y}^j}.$$

Each element in $U_j$ is called a unique subcase of $f_j$. The unique subcase $${}^j f_{q_{k_x}^j}$$

is simplified as ${}^j u_x$ in the following sections. The unique subcase set $U_j$ is then $\{{}^j u_1, {}^j u_2, \ldots, {}^j u_x, \ldots, {}^j u_{z_j}\}$.

It should be noted that $f_0$ has only one unique subcase which can be denoted as ${}^0 u_1$.

Based on the proposition 5, detection and discrimination of a unique subcase is equivalent to discriminating the unique subcase from all the other unique subcases (including ${}^0 u_1$). Since there can be unique subcases that cannot be discriminated from each other, D-classes in a transient state are defined.

In a transient state, a D-class is a set of unique subcases that are not discriminable from each other. All unique subcases that cannot be discriminated from each other are placed in one D-class. The number of D-classes of a system is denoted as rl which indicates the system's capability in detecting and discriminating faults in the transient state. The equivalence level of a system in a transient state is defined below and can be used to assess the system's capability of detecting and discriminating faults in a transient state.

The equivalence level of a system in a transient is the degree to which the system cannot detect and discriminate the unique subcases of fault conditions. The equivalence level is denoted as $e = \Sigma_{j=1}^n z_j - \eta$, where $z_j$ is the number of unique subcases of a fault $f_j$ condition, $\eta$ is the number of D-classes in the transient state.

Figure 7:
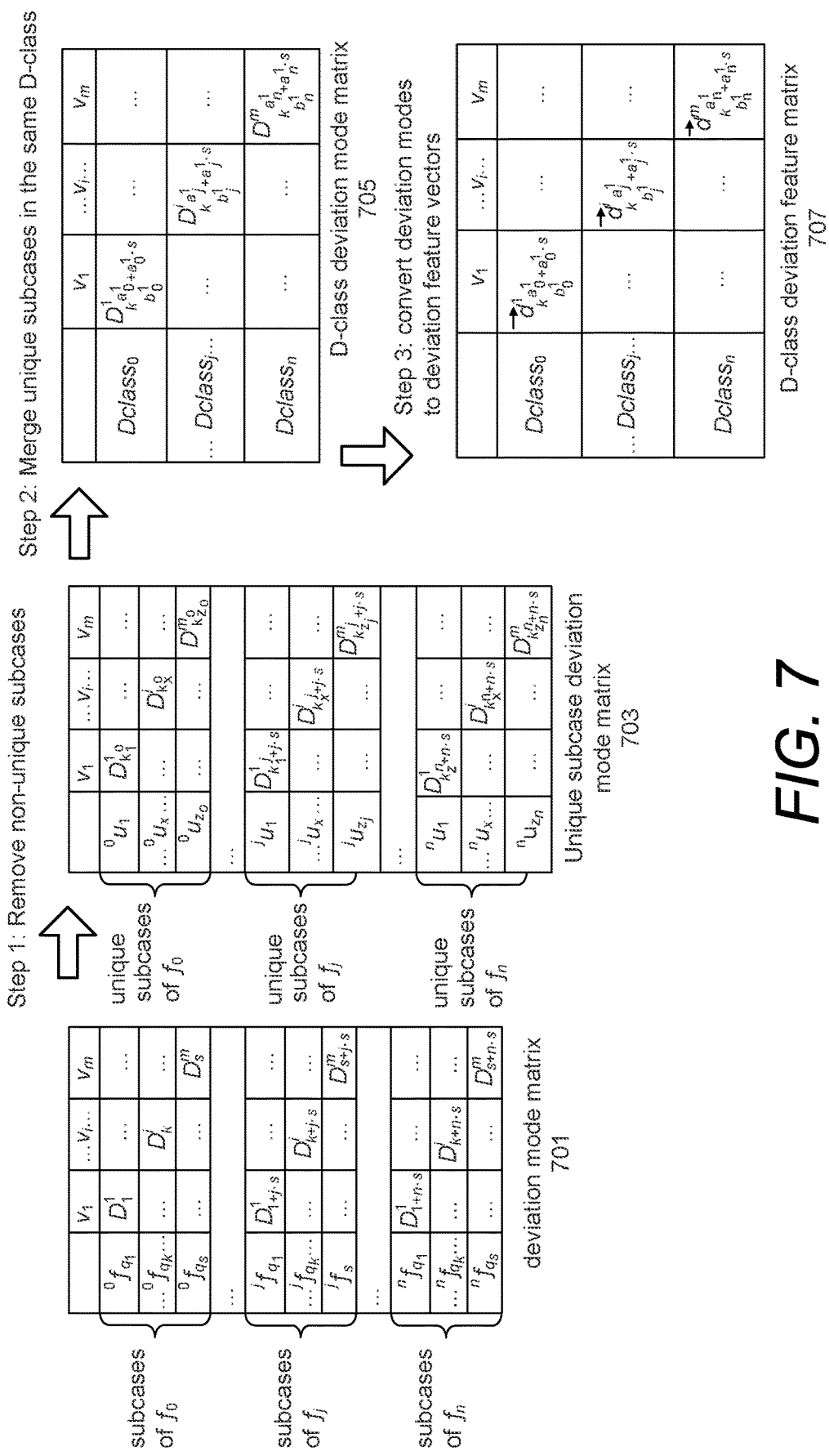
FIG. 7 is an illustration of an example method for generating one or diagnosis strategy matrices.

Based on the criteria established to detect and discriminate a unique subcase, generating the diagnosis strategy matrices is described below. The method used is illustrated in FIG. 7 as an example.

At step 1, the subcases that are not in a unique subcase set are removed from the fault feature matrices to reduce the dimension of the matrices. The deviation mode matrix 701 contains $(n+1) \cdot s$ rows. Each row is corresponding to a subcase of a fault. It may be assumed that there are $z_j$ unique subcases in the fault $f_j$ condition. This step 1 generates a unique subcase deviation mode matrix 703 with $\Sigma_0^n z_j$ rows. Each row of the matrix 703 may be a unique subcase of a fault.

At step 2, the unique subcases that are in the same D-class can be further merged to generate the D-class time order matrix, D-class deviation mode matrix, and D-class variation mode matrix. Consider that D_class$_j$ consists of $\eta_j$ unique subcases, i.e. $\{{}^{a_j^1} u_{b_j}^1, {}^{a_j^2} u_{b_j}^2, \ldots, {}^{a_j^{\eta_j}} u_{b_j}^{\eta_j}\}$. The generated D-class deviation mode matrix 705 is illustrated in FIG. 7.

At step 3, the diagnosis strategy matrices which can be used to generate the PFDD strategy 147 are generated. The diagnosis strategy matrices include the deviation strategy matrix, variation strategy matrix and time order strategy matrix. The deviation strategy matrix and variation strategy matrix can be generated by converting the deviation modes and variation modes of the D-class deviation mode matrix and D-class variation mode matrix into the related deviation feature vectors and variation feature vectors. The D-class deviation feature matrix 707 obtained from step 3 is illustrated in FIG. 7.

Generating the PFDD strategy 147 in a transient state is similar to how the PFDD strategy 147 in a steady state is generated. In a transient state, the deviation index vector and variation index vector under the current condition of the system 110 can be obtained in real-time by the PFDD engine 140 using the sampled signals and the predicted values of each observed variable. Once a deviation of a variable is observed, the deviation feature vector, variation feature vector, and time order of the variables under the current condition can be calculated and compared with each row of the diagnosis strategy matrices.

The deviation feature vector, variation feature vector, and time order of a variable $v_i$ under the current condition are $\vec{d}^{\prime i}$, $\tilde{c}^{\prime i}$, and $\tilde{O}^i$ D_class$_j$ can be eliminated from the diagnosis if d does not match the pre-defined deviation feature vector $\vec{d}_{a_j 1}{}^i$, does not match $\vec{c}_{a_j 1}{}^i$, or $\tilde{O}^i$ is not equal to $O_{a_j 1}{}^i$. The features of each variable (i.e. $\vec{d}^{\prime i}$, $\tilde{c}^{\prime i}$, and $\tilde{O}^i$) are updated as time proceeds. Only one D-class will remain. The fault in the system 110 can be discriminated by relating the subcases in that D-class to the associated faults.

Overall, the PFDD strategy 147 for a transient state condition can be generated as follows. 1. Construct the ISFA model 137 of the system 110 in the transient state. 2. Inject faults and simulate the model 137 in each subcase of the transient state. 3. Generate the fault feature matrices 146 (i.e., time order matrix, deviation mode matrix, and variation mode matrix) based on the results of simulation. 4. Determine the unique subcases for each fault. 5. Define the D-classes of the unique subcases of the faults. 6. Generate the reduced fault feature matrices. 7. Generate the diagnosis strategy matrices. 8. Determine the PFDD strategy 147 in the transient state.

The sensor engine 150 may select an optimal set of sensors 155 by selecting an optimal subset of variables from the system 110 to monitor. The selected sensors 155 may then be placed at locations in the system 110 where the corresponding signals 113 to the variables may be best monitored.

An optimal subset of variables shall satisfy two goals of sensor deployment. The primary goal is to maximize the system capability for fault detection and discrimination. The secondary goal is to minimize the cost of sensor 155 deployment. As defined before, the equivalence level can be used to measure the system's capability for fault detection and discrimination. The system's capability can be maximized by selecting a set of variables that minimize the system equivalent level.

The cost of sensor deployment is directly related to the number of variables selected. For purposes of illustration, it is assumed that the costs of all sensors 155 are equal. The variable selection rate is defined below and used to assess the cost of sensor deployment for the set of variables selected.

The variable selection rate is defined as the proportion of variables selected in all observable variables and denoted as γ (see equation (8)).

$$\gamma = \frac{\text{number of variables selected}}{\text{total number of variables}} \quad (8)$$

An optimal subset of variables shall be selected using two criteria: 1) first minimize the system equivalent level, 2) then minimize the variable selection rate. A measure quality index is defined below to quantify the degree to which the variables selected satisfy the two criteria.

Given a subset of variables, the quality index λ of the subset is defined as the sum of system equivalence level $e_{sys}$ and the variable selection rate (i.e., $\lambda = e_{sys} + \gamma$). An optimal subset of variables is a subset of variables whose quality index is minimized.

Given a system 110, the set of observable variables is defined as V. The power set of V can be defined as $P_V$. Each element in $P_V$ is a subset of V. $P_V$ consists of all subsets of variables that can be generated from V. The cardinality of set V is the number of observable variables and can be denoted as card(V). The cardinality of the set $P_V$ is the number subsets that can be obtained from V and can be denoted as card($P_V$). Since each observable variable in V is either selected or not selected in a subset, the cardinality of $P_V$ can be obtained as using equation 9 where $C_{card(v)}^i$ is the number of combinations obtained when choosing i elements from card(V) elements.

$$\text{card}(P_V) = \sum_{i=0}^{card(V)} C_{card(V)}^i = 2^{card(V)} \quad (9)$$

The strategy of selecting an optimal subset of variables is to search for an element in $P_V$ whose quality index is lower than or equal to all the other elements of $P_V$.

The sensor engine 150 may select the optimal set of variables and may select the sensors 155 corresponding to the signals 113 that are associated with the variables. The total number of steady states and transient states of a system is 1. The states can be denoted in a state set S={$S_1$, $S_2$, ..., $S_k$, ..., $S_l$} where k∈[1, 1]. A state $S_k$ can be a steady state or a transient state.

Given the ISFA model 137 of the system, the sensor engine 150 may use the ISFA model 137 to simulate each state of the system. As described above, each simulation for a state results in deviation index vectors and variation index vectors for each observable variable in the ISFA model 137. The sensor engine 150 may select the optimal variables for the set of optimal variables based on the deviation index vectors and variation index vectors. Depending on the embodiment, the optimal variables may be selected using one or both of a brute force algorithm or a genetic algorithm. Other types of algorithms may be used.

Figure 8:
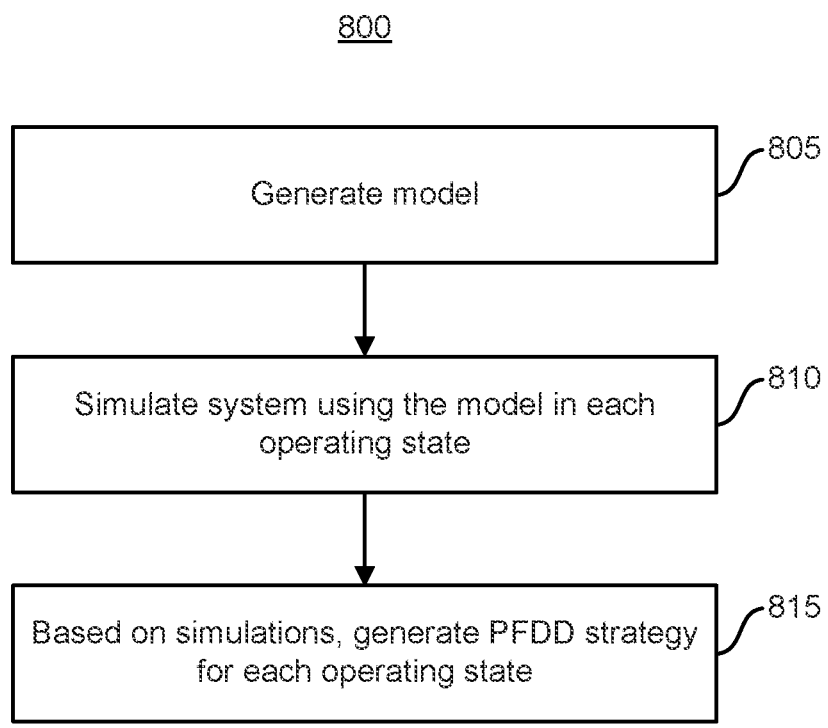
FIG. 8 is an illustration of an example method for generating one or more PFDD strategies.

FIG. 8 is an illustration of an example method 800 for generating one or more PFDD strategies 147. The method 800 may be implemented by the sensor optimizer 120.

At 805, a model is generated. The model 137 may be an ISFA model 137 and may be generated by the model engine 130 from an existing system model 135 of a system 110. Depending on the embodiment, the model engine 130 may generate an ISFA model 137 for each operating state of the system 110.

At 810, the system is simulated using the model in each operating state. The system 110 may be simulated by the PFDD engine 140 using the ISFA model 137 for each state by injecting faults of a plurality of faults into the ISA model 137. As part of simulating the system 110, the PFDD engine 140 may determine one or more propagation features related to each of the faults.

At 815, PFDD strategies are generated for each operating state. The PFDD strategies 147 may be generated by the PFDD engine 140 from the propagation features related to each of the faults. In some embodiments, the propagation features may be one or more feature matrices 146.

Figure 9:
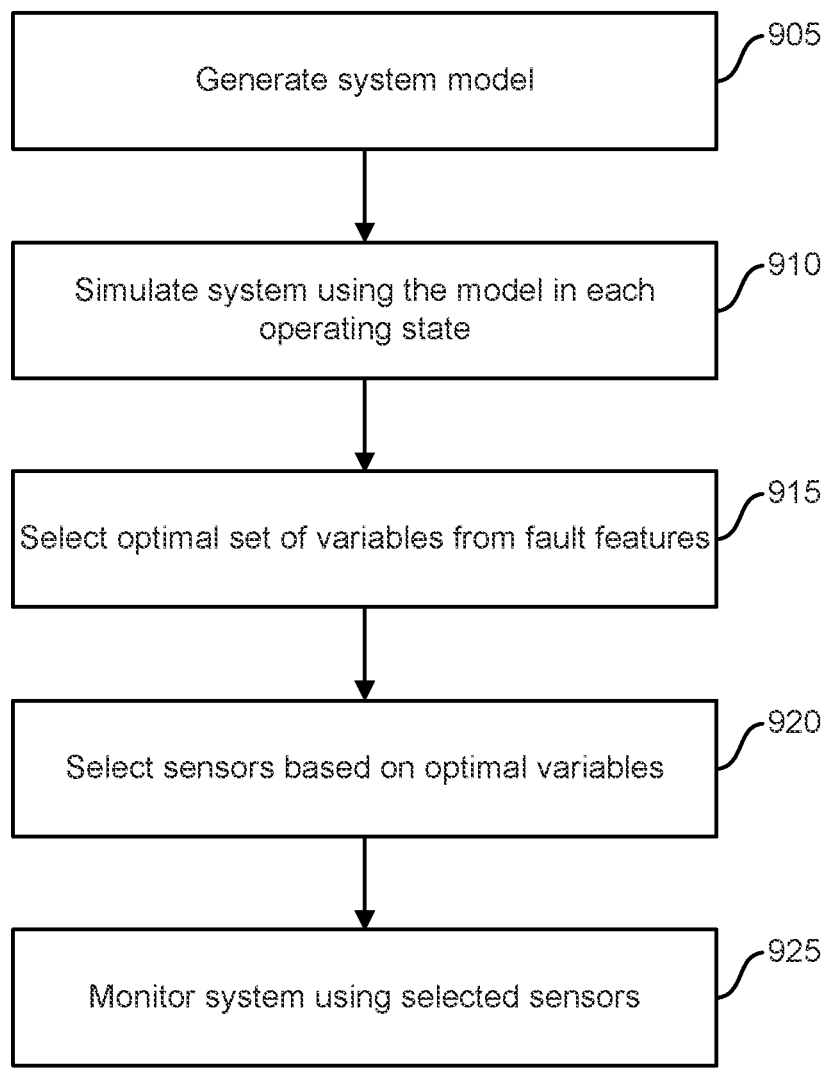
FIG. 9 is an illustration of an example method for selecting one or more sensors to monitor a system for faults.

FIG. 9 is an illustration of an example method for selecting one or more sensors 155 to monitor a system 110 for faults. The method 900 may be implemented by the sensor optimizer 120.

At 905, a model is generated. The model 137 may be an ISFA model 137 and may be generated by the model engine 130 from an existing system model 135 of a system 110. Depending on the embodiment, the model engine 130 may generate an ISFA model 137 for each operating state of the system 110. The model 137 may include a plurality of variables and each variable may correspond to a signal 113 of the system 110.

At 910, the system is simulated using the model in each operating state. The system 110 may be simulated by the PFDD engine 140 using the ISFA model 137 for each state by injecting faults of a plurality of faults into the ISA model 137. As part of simulating the system 110, the PFDD engine 140 may generate one or more feature matrices 146 related to each of the faults and operating state.

At 915, an optimal set of variables is selected. The optimal set of variables may be selected by the sensor engine 150 from the one or more feature matrices 146. Depending on the embodiment, the sensor engine 150 may use a genetic algorithm to select the variables.

At 920, sensors are selected based on the optimal set of variables. The sensors 155 may be selected by the sensor engine 155. Depending on the embodiment, the sensor engine 155 may select a sensor 155 for each variable in the set of optimal variables.

At 925, the system is monitored using the selected sensors. The system 110 may be monitored by placing each sensor 155 at a location in the system 110 where it can monitor the signal 133 associated with the variable corresponding to the sensor 155.

Figure 10:
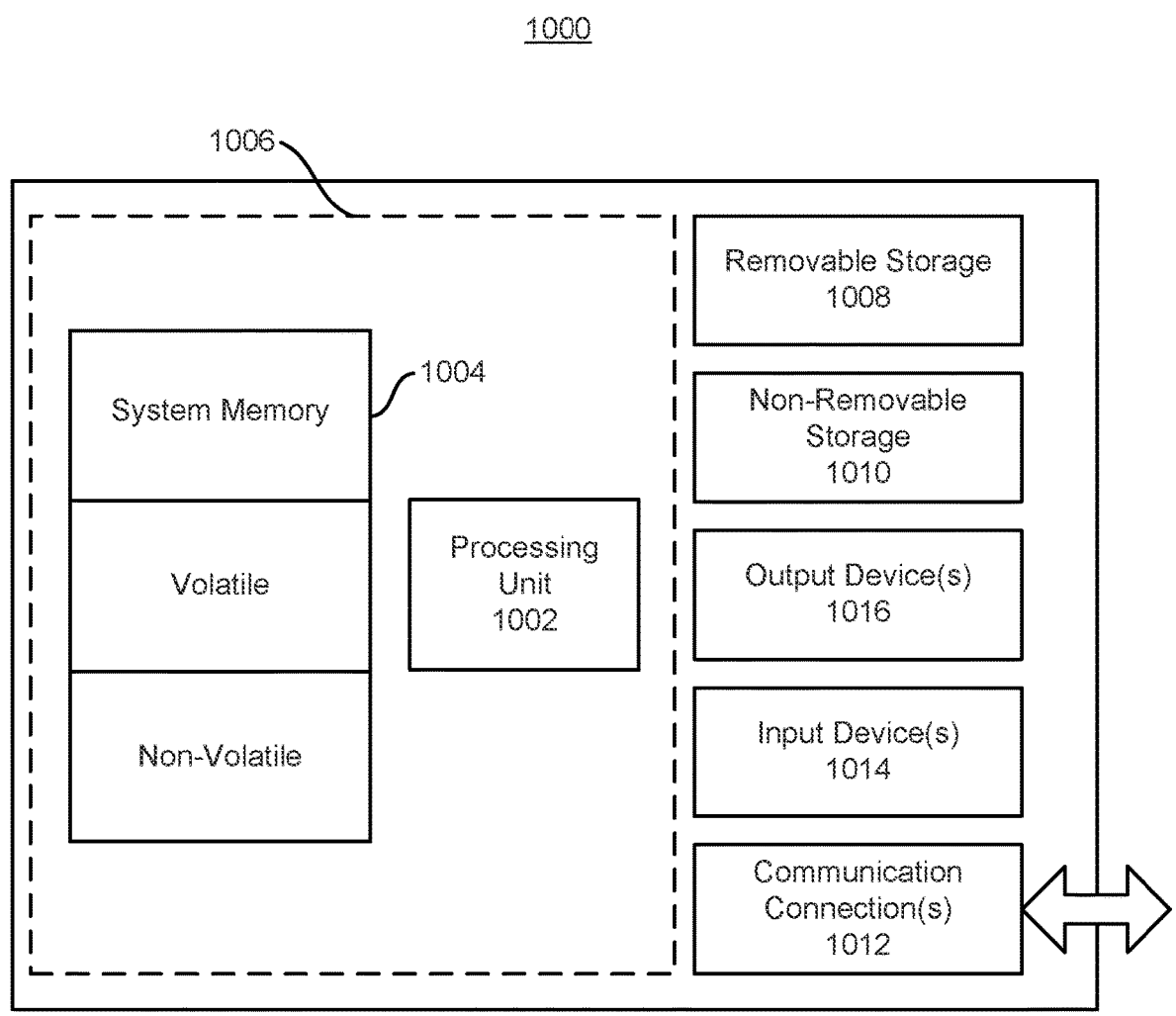
FIG. 10 shows an exemplary computing environment in which example embodiments and aspects may be implemented.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
generating a model of a system by a computing device;
simulating the system using the model in each operating state of a plurality of operating states by the computing device; and
based on the simulations, generating a propagation-based fault detection and discrimination ("PFDD") strategy for each operating state by the computing device to infer trends of signal changes in different operating states for a simulated fault condition at discrete time periods by deriving a deviation index indicative of a deviation of a variable in the fault condition at a time point and a deviation index vector that consists of deviation indexes of the variable at all time points in the simulated fault condition.

2. The method of claim 1, further comprising:
determining a current operating state of the plurality of operating states of the system; and
detecting and discriminating one or more faults in the system using the PFDD strategy generated for the current operating state.

3. The method of claim 1, wherein generating the model comprises generating a quantitative model and an algebraic model.

4. The method of claim 3, wherein the quantitative model is generated using differential equations.

5. The method of claim 3, wherein the algebraic model is generated from the quantitative model using discretization methods.

6. The method of claim 3, wherein simulating the system using the model in each operating state of a plurality of operating states comprises repeatedly simulating the system using the generated algebraic model for a plurality of iterations.

7. The method of claim 6, wherein a different fault is introduced into the simulation at each iteration of the plurality of iterations.

8. The method of claim 1, wherein the plurality of operating states comprises steady states and transient states, and generating the PFDD strategy for a transient state comprises:
generating a plurality of fault feature matrices based on the simulation of the transient state for each of a plurality of faults;

determining a plurality of unique subcases for each fault based on the fault feature matrices;
defining one or more D-classes for each unique subcase of the plurality of unique subcases;
generating a reduced fault feature matrix from the defined one or more D-Classes for each unique subcase of the plurality of unique subcases;
generating one or more diagnosis strategies matrices based on the reduced fault feature matrix; and
determining the PFDD strategy for the transient state based on the one or more diagnosis strategies matrices.

9. The method of claim 8, wherein generating the PFDD strategy for a steady state comprises:
generating a plurality of fault feature matrices based on the simulation of the steady state for each of a plurality of faults;
defining one or more D-classes for each pair of faults of the plurality of faults;
generating one or more D-class feature matrices from the defined one or more D-classes;
generating one or more diagnosis strategies matrices based on the one or more D-class feature matrices; and
determining the PFDD strategy for the steady state based on the one or more diagnosis strategies matrices.

10. The method of claim 1, wherein simulating the system using the model in an operating state of the plurality of operating states comprises:
determining a plurality of faults associated with the system; and
for each fault of the plurality of faults, injecting the fault into the model and simulating the system using the model with the injected fault for the operating state.

11. The method of claim 10, further comprising:
determining one or more propagation features related to each fault of the plurality of faults based on the simulations; and generating the PFDD strategy for each operating state based on the determined one or more propagation features.

12. The method of claim 1, wherein generating a PFDD strategy for an operating state comprises:
generating one or more fault feature matrices for the operating state;
generating one or more D-class feature matrices based on the one or more fault feature matrices;
generating one or more diagnosis strategy matrices based on the one or more D-class feature matrices; and
generating the PFDD strategy for the operating state based on the one or more diagnosis strategy matrices.

13. A method comprising:
generating a model of a system by a computing device, wherein the model includes a plurality of variables;
simulating the system using the model in each operating state of a plurality of operating states by the computing device to infer trends of signal changes in different operating states for a simulated fault condition at discrete time periods by deriving a deviation index indicative of a deviation of a variable in the fault condition at a time point and a deviation index vector that consists of deviation indexes of the variable at all time points in the simulated fault condition; and
based on the simulations, selecting an optimal subset of the plurality of variables.

14. The method of claim 13, wherein simulating the system using the model in an operating state of the plurality of operating states comprises:
determining a plurality of faults associated with the system; and
for each fault of the plurality of faults, injecting the fault into the model and simulating the system using the model with the injected fault for the operating state; and
generating one or more fault feature matrices for the operating state.

15. The method of claim 14, further comprising selecting the optimal subset of the plurality of variables using the one or more fault feature matrices.

16. The method of claim 15, further comprising selecting the optimal subset of the plurality of variables using the one or more fault feature matrices using a genetic algorithm.

17. The method of claim 13, further comprising selecting one or more sensors based on the optimal subset of the plurality of variables.

18. The method of claim 17, further comprising monitoring one or more signals of the system using the selected one or more sensors.

19. A first system comprising:
at least one computing device; and
a computer readable medium storing computer executable instructions that when executed by the at least one computing device cause the at least one computing device to:
generate a model of a second system;
simulate the second system using the model in each operating state of a plurality of operating states; and
based on the simulations, generate a propagation-based fault detection and discrimination ("PFDD") strategy for each operating state to infer trends of signal changes in different operating states for a simulated fault condition at discrete time periods by deriving a deviation index indicative of a deviation of a variable in the fault condition at a time point and a deviation index vector that consists of deviation indexes of the variable at all time points in the simulated fault condition.

20. The first system of claim 19, further comprising computer executable instructions that when executed by the at least one computing device cause the at least one computing device to:
determine a current operating state of the plurality of operating states of the second system; and
detect and discriminate one or more faults in the second system using the PFDD strategy generated for the current operating state.

* * * * *